UNITED STATES PATENT OFFICE.

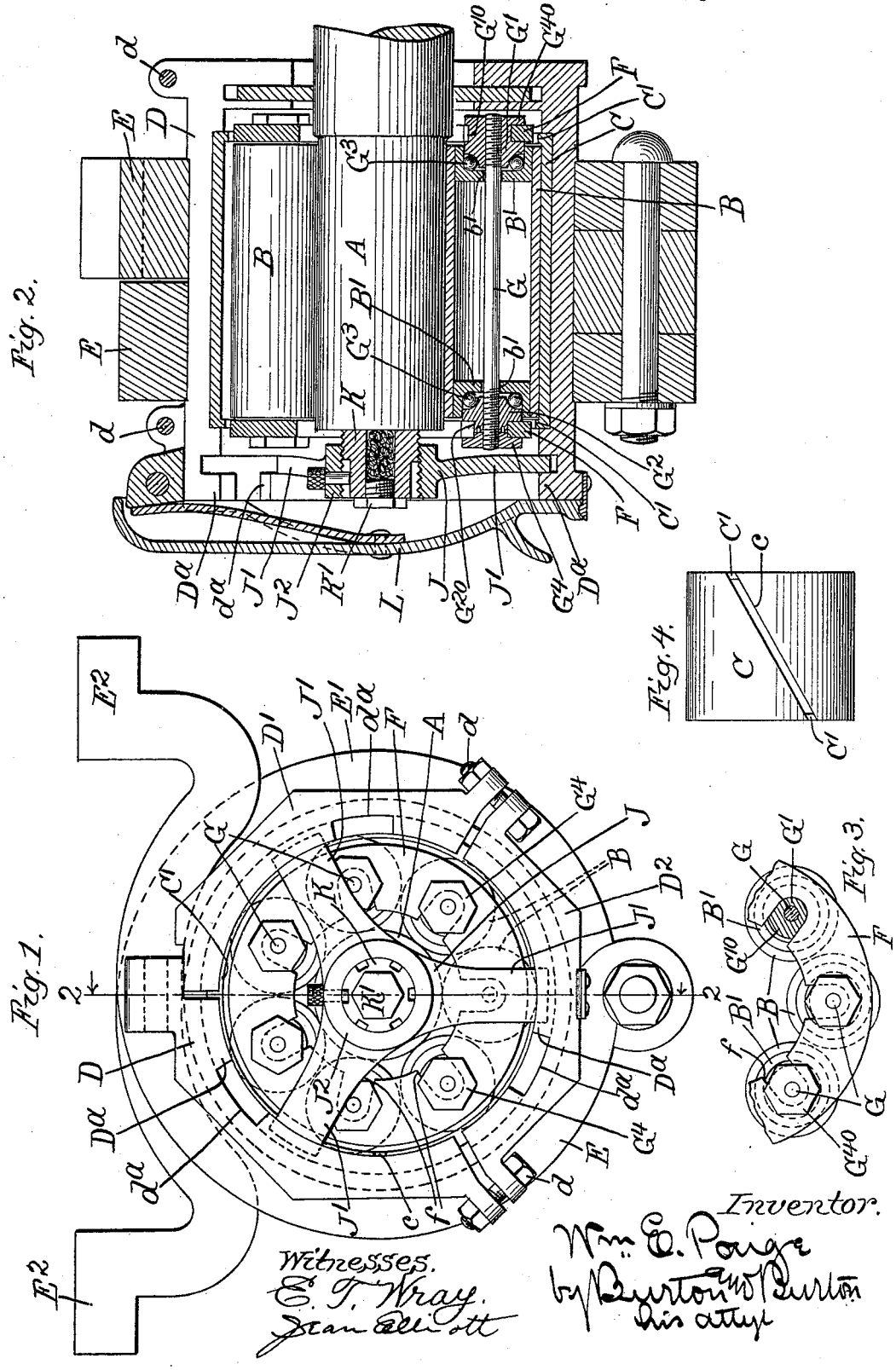

WILLIAM EDWARD PAIGE, OF CHICAGO, ILLINOIS.

ROLLER-BEARING AND JOURNAL-BOX.

SPECIFICATION forming part of Letters Patent No. 582,310, dated May 11, 1897.

Application filed August 3, 1896. Serial No. 601,505. (No model.)

*To all whom it may concern:*

Be it known that I, WILLIAM EDWARD PAIGE, a citizen of the United States, residing at Chicago, county of Cook, and State of Illinois, have invented certain new and useful Improvements in Roller-Bearings and Journal-Boxes, which are fully set forth in the following specification, reference being had to the accompanying drawings, forming a part thereof.

This invention is an improvement upon a roller-bearing and journal-box for which there were granted me Letters Patent No. 548,136, dated October 16, 1895.

The improvement involves a different arrangement of the antifriction-rollers and different means for spacing them, and involves also antifriction-bearings for the spacing devices. It includes also certain detail improvements in devices for stopping the end thrust of the axle and duplicating the same at the end.

It consists of the details of construction which are set out in the claims.

In the drawings, Figure 1 is a front elevation of my improved journal-box, the representation being of a car-axle box. Fig. 2 is a section at the line 2 2 on Fig. 1. Fig. 3 is a detail, and Fig. 4 illustrates the contractile lining of the box.

A is the axle.

B B B, &c., are antifriction-rollers, seven in number, arranged about the journal of the axle.

C is a contractile steel band which encircles the rollers and is adapted to contract or be contracted upon them to hold them upon the axle.

D D' D² are the three parts of a journal-box, of which the contractile band C constitutes the lining or roller-seat, said three parts being suitably connected by bolts $d\ d$, &c., and adapted to close up more or less as occasion may require upon the contractile band and rollers.

E E' are two parts of a clamping-yoke which encircles the three-part box D D' D² and tends to close up the parts of said box and cause them to close up the contractile band upon the rollers. The outstretched ends E² E² of the yoke E E' are adapted to support the load.

In respect to the three-part box and the yoke E E' the construction shown is substantially that covered by my above-mentioned patent, No. 548,136, dated October 15, 1895. In the construction shown in that patent wherein to reduce the friction to strictly rolling friction two sets of rollers were employed, the individuals of each set being spaced by the individuals of the other set, difficulty is experienced in practice arising from the tendency of the rollers to become massed around one side. In order to overcome that defect, I employ in the present invention retaining or spacing rings F F, in which axles for the several rollers are mounted and retained at proper distances from each other in the circle in which the rollers are arranged about the car-axle, and in order that the spacing of the rollers in this manner shall not interfere with the function of the contractile and clamping yoke in taking up the lost motion due to wear of the axle and rollers or their seat in the journal-box I make the seats of the roller-axles in the spacing-rings F F radially elongated, so that said axles may move radially toward the center of the main axle to close up the rollers in compensating for wear. Further, in order to reduce all the friction due to rotation to rolling friction, I provide ball-bearings for the several antifriction-rollers on their respective axles.

The spacing-rings F F have their central openings somewhat larger than the axle A and their outer diameter nearly equal to the diameter of the axle A added to twice the diameter of the antifriction-rollers B B B. The contractile band C is cut obliquely at $c$ to prevent the passage of the rollers over the junction of the ends being abrupt, and in order to retain the rollers against endwise displacement the said band is provided with slight inwardly-projecting marginal flanges C' C', which overhang the ends of the rollers.

G G G, &c., are axles for the rollers B B B, &c. Said rollers I prefer to make of steel tubes, into the ends of which are forced tightly by hydraulic pressure or otherwise permanently inserted hardened-steel cups B' B', which are centrally apertured at $b'$ to permit the axles G to extend through them. The axles G extend through the central openings in the cups or ball-seats B', and have secured to them the cones G' and G² at their opposite ends, respectively. The cone G' has the oblong hub or neck G¹⁰, adapted to enter and be non-rotatable in the elongated seat hereinafter described in the spacing-ring, and the cone G² has the hub or neck G²⁰ cylindrical, because it is adapted to enter and be rotatable in the elongated seat in the spacing-ring. The cone G' is in any manner fixedly secured on the axle G, and may be formed integrally therewith. The cone G² is longitudinally adjustable on the axle G, and most conveniently such longitudinal adjustability is obtained by threading the axle and screwing the cone thereon.

G³, &c., represent the antifriction-balls interposed between the cones respectively and the ball-seats in the cups B' B'. These ball-bearings, it will be understood, can be suitably adjusted to take up wear by screwing up the cone G² on the axle. A nut G⁴, screwed onto the threaded end of the axle G against the end of the cone G², serves as a jam-nut to secure the cone fixedly as adjusted. The seats for the axles G G, &c., in the spacing-rings F F are formed by recessing said spacing-rings radially from the inner circumference, making thus elongated seats opening into the central aperture of the ring. These seats $f$, &c., are of suitable width to admit the necks G²⁰ and G¹⁰ of the cones of the axles G, and the rings are retained against displacement longitudinally with respect to the axles by the jam-nut G⁴ at the forward end and a corresponding head or flange at the rear end, which may be integral with the cone or may be a jam-nut, according to the method adopted for securing the cone G' to the axle, but which I have shown in form identical with the jam-nut G⁴. The nut G⁴ and flange G⁴⁰ have their hexagon heads considerably greater in diameter than the necks of the cones, and between them and the shoulders of the cones at the opposite ends of the necks the spacing-rings are retained.

To resist the end thrust of the axle and prevent the same from causing an end thrust on the antifriction-rollers, I provide at the forward end of the journal-box a cross-head in the form of a spider J, which is most conveniently made with three limbs J' J' J', which may be entered through the notches $d^a$ $d^a$ $d^a$ between the lugs D^a D^a D^a, formed on the forward ends of the three parts D D' D² of the three-part journal-box, and being rotated a few degrees are engaged behind the lugs and thereby retained. At the center of this cross-head, through its hub J², there is screwed and thereby rendered adjustable in the direction of the axle A the steel tube K, which has its inner end terminating in a plane at right angles to its axis and in position to bear directly against the end of the axle and receive the end thrust of the latter. The central cavity of the tube K is designed to be packed with waste saturated with lubricating-oil, and it is closed at the outer end by a plug K', which may be removed to supply oil or waste. Severe friction between the end of the tube K and the end of the axle being not constant but occurring only when the axle from any cause receives an end thrust, does not tend seriously to cause wear, and a very small quantity of oil furnished in the manner shown will prevent such wear, and it is not necessary to saturate the waste with oil to such extent as to cause it to flow perceptibly from the end of the tube or from the axle.

The purpose of making the cross-head J in the form of a spider, as shown, is that the arms of such spider may have sufficient elasticity to cause the end thrust to be received upon a slightly-yielding stop, dispensing with the necessity for any other spring to give that result.

The forward side of the journal-box may be covered to protect it from dust by any convenient form of cover. I have illustrated a swelled or bulging cover L, suitably hinged at the upper side and adapted to be latched at the lower side. The detail construction of this cover is not a part of my invention and will not be further described, the same being familiar in the art.

I claim—

1. In a journal-box in combination with the box composed of a plurality of parts adapted to be radially closed up, suitable lining adapted to be contracted by closing up the box and means for so closing up the same, the shaft or axle, antifriction-rollers arranged within the box about the shaft or axle, and spacing-rings for the axles of said rollers, such spacing-rings having the seats for said axles elongated to permit the rollers to be closed up toward the axle.

2. In a journal-box in combination with the box consisting of a plurality of parts adapted to be closed up radially, suitable continuous lining for such box adapted to be contracted by the closing up of the box, the axle and antifriction-rollers arranged thereabout within the lining, spacing-rings for said rollers, and ball-bearings by which the spacing-rings are supported on the rollers.

3. In a journal-box in combination with the box consisting of a plurality of parts adapted to be closed up radially, suitable continuous lining for such box adapted to be contracted about the rollers by the closing up of the box, the axle and antifriction-rollers arranged thereabout within the lining, spacing-rings for said rollers and ball-bearings by which the spacing-rings are supported on the rollers, the ball-bearing cases having elongated seats in the spacing-rings.

4. In a journal-box in combination with the axle antifriction-rollers arranged thereabout within the box, a contractile band encompassing the rollers and having inwardly-projecting marginal flanges which overhang the end of the rollers to retain the rollers against endwise displacement.

5. In a journal-box composed of a plurality of parts and adapted to be closed up radially, the contractile band constituting a lining for such box, the axle journaled therein and antifriction-rollers interposed between the axle and the lining, said lining being split or divided obliquely with respect to the axis whereby the rollers in passing the junction bear upon both ends simultaneously.

6. In a car-axle journal-box in combination with the axle and antifriction-rollers thereabout within the box, a spider having radial arms and adapted to be rigid at the ends of such arms with the journal-box and having a central hub, an end-thrust bearing set through said central hub against the end of the axle and adapted to be adjusted longitudinally to receive said end thrust and transmit the same to the spider.

7. In a car-axle journal-box in combination with the axle a cross-head in the form of a spider having radial arms adapted to be made rigid at the ends of said arms with the box and having a central hub which stands opposite the end of the axle and an end-thrust bearing adjustably mounted in said hub adapted to receive the end thrust of the axle and transmit the same to the spider whereby the spider-arms afford elastic resistance to the end thrust of the axle, and the tension of said resistance is increased by setting the end-thrust bearing inward toward the axle.

8. In a car-axle journal-bearing, in combination with the axle and antifriction-rollers about the same; spacing-rings at opposite ends of the journal, and axles for the antifriction-rollers connecting the rings; two-part cases for ball-bearings between the rollers and the axles respectively, one part being fixed in the roller and the counterpart being fixed on the axle, the latter part being extended to seat in the spacing-rings and thereby to seat the axles therein, the seats in the ring being elongated to permit radial adjustment of the roller-axle, the ball-case part at one end of the roller-axle being rotatable and that at the other end being non-rotatable in the seat.

In testimony whereof I have hereunto set my hand, in the presence of two witnesses, at Chicago, Illinois, this 31st day of July, 1896.

WILLIAM EDWARD PAIGE.

Witnesses:
CHAS. S. BURTON,
JEAN ELLIOTT.